United States Patent
Phay

(10) Patent No.: US 10,467,441 B2
(45) Date of Patent: Nov. 5, 2019

(54) METHOD OF RECOGNIZING WHETHER A TRANSPONDER OF AN RFID SYSTEM IS PRESENT IN A BOUNDARY REGION, RFID SYSTEM AND SAFETY SWITCH

(71) Applicant: SICK AG, Waldkirch/Breisgau (DE)

(72) Inventor: Victor Kok Heng Phay, Singapore (SG)

(73) Assignee: SICK AG, Waldkirch/Breisgau (DE)

( * ) Notice: Subject to any disclaimer, the term of this patent is extended or adjusted under 35 U.S.C. 154(b) by 0 days.

(21) Appl. No.: 14/878,209

(22) Filed: Oct. 8, 2015

(65) Prior Publication Data
US 2016/0104014 A1 Apr. 14, 2016

(30) Foreign Application Priority Data
Oct. 13, 2014 (EP) .................................... 14188628

(51) Int. Cl.
*G06K 7/10* (2006.01)
(52) U.S. Cl.
CPC ..... *G06K 7/10128* (2013.01); *G06K 7/10009* (2013.01)
(58) Field of Classification Search
CPC ........... G06K 7/10009; G06K 7/10089; G06K 7/1009; G06K 7/10128; G01S 13/00
See application file for complete search history.

(56) References Cited

U.S. PATENT DOCUMENTS

| | | | |
|---|---|---|---|
| 2002/0184568 A1* | 12/2002 | Kurrasch | G06F 11/0748 714/39 |
| 2007/0014341 A1* | 1/2007 | Rowse | H04L 1/243 375/224 |
| 2007/0129039 A1 | 6/2007 | Sherrets | |
| 2010/0066325 A1* | 3/2010 | Shionoiri | G06K 19/0701 323/282 |

(Continued)

FOREIGN PATENT DOCUMENTS

| | | |
|---|---|---|
| CN | 101178765 A | 5/2008 |
| CN | 101178766 A | 5/2008 |

(Continued)

OTHER PUBLICATIONS

Deyle, et al., "RF Vision: RFID Receive Signal Strength Indicator (RSSI) Images for Sensor Fusion and Mobile Manipulation", https://smartech.gatech.edu/bitstream/handle/1853/37360/iros09_rf_vision.pdf, Retrieved Oct. 21, 2015.

(Continued)

*Primary Examiner* — Daniell L Negron
(74) *Attorney, Agent, or Firm* — Nath, Goldberg & Meyer; Jerald L. Meyer; Stanley N. Protigal

(57) ABSTRACT

The present invention relates to a method of recognizing whether a transponder of an RFID system, comprising a reading device and the transponder, is present in a boundary region, wherein a comparison is made with at least one threshold value. In accordance with the invention a bit error rate of signals transmitted between the transponder and the reading device is determined and the at least one threshold (Continued)

Figure 1:
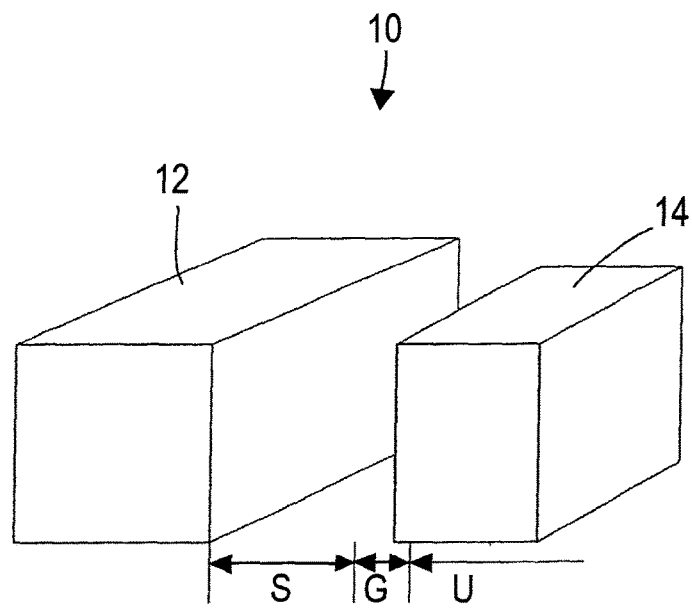

value comprises a predefined bit error rate for signals transmitted between the transponder and the reading device. The invention further relates to an RFID system and to a safety switch.

15 Claims, 2 Drawing Sheets

(56) References Cited

U.S. PATENT DOCUMENTS

| | | |
|---|---|---|
| 2011/0057840 A1 | 3/2011 | Ko |
| 2014/0035731 A1 | 2/2014 | Chan et al. |
| 2015/0180544 A1* | 6/2015 | Morimoto .............. G06F 3/048 455/41.1 |

FOREIGN PATENT DOCUMENTS

| | | |
|---|---|---|
| CN | 103891158 A | 6/2014 |
| EP | 1 702 409 A1 | 9/2006 |
| EP | 1 876 551 A1 | 1/2008 |
| EP | 2 196 947 A1 | 6/2010 |

OTHER PUBLICATIONS

Jin, et al., "RSSI Based Location-Aware PC Power Management", http://www.sigops.org/sosp/sosp09/papers/hotpower_8_jin.pdf, Retrieved Oct. 21, 2015.

Benkic, et al., "Using RSSI value for distance estimation in wireless sensor networks based in ZigBee", http://ieeexplore.ieee.org/xpl/login.jsp?reload=true&tp=&arnumber=4604427&url=http%3A%2F%2Fieeexplore.ieee.org%2Fxpls%2Fabs_all.jsp%3Farnumber%3D4604427, Conference Dates Jun. 25-28, 2008.

* cited by examiner

METHOD OF RECOGNIZING WHETHER A TRANSPONDER OF AN RFID SYSTEM IS PRESENT IN A BOUNDARY REGION, RFID SYSTEM AND SAFETY SWITCH

The present invention relates to a method of recognizing whether a transponder of an RFID system comprising a reading device and the transponder is present in a boundary region. The invention further relates to an RFID system, as well as to a safety switch.

RFID elements (Radio Frequency Identification) are used in transmitter/receiver systems for the automatic and contactless identification and/or localization of objects by means of radio waves. An RFID system typically comprises one transponder (also referred to as a "tag" or as a "radio tag") that comprises an antenna and is present at or in the object. It generally comprises a characteristic code that can be retrieved via the antenna by a reading device of the RFID system (also referred to as a "transceiver"). The transceiver likewise comprises an antenna for this purpose and a transceiver circuit for the reading out this code from the transponder. For reading out the code from the transponder, the reading device typically generates magnetic fields in order to transmit signals to the transponder. On receipt of a signal from the reading device, the transponder is configured for the purpose of re-transmitting a corresponding signal to the reading device, the signal comprising data, in particular the code. The reading device forwards these signals to a system (e.g. a computer system) for the further processing thereof or can evaluate this itself by means of a microcontroller. The term re-transmission is in this example also used when the transponder is configured to influence the magnetic field of the reading device without itself generating a magnetic field. This influencing is then detected by the reading device.

Having regard to RFID systems of short range (typically of 20 mm range) the reading device generates magnetic interactive fields that are not only provided for the transmission of the data, but frequently also serve the purpose of supplying the transponder with energy.

This range is, on the one hand, dependent on the environment in which the reading device is used. When a reading device is e.g. installed at a metallic support, this can then influence the magnetic coupling between the reading device and the tag in such a way that the range is reduced.

Furthermore, temperature differences (e.g. at different times of the day) can influence the range. When the transponder is present at the boundary of this range the transponder indeed still transmits signals that can be received by the reading device, however, these can be erroneous. In particular having regard to dangerous machines, dangerous situations can hereby arise, when, for example, access is allowed when this should be prevented and/or access is denied when this should be allowed. As a consequence thereof, the machine is brought into a secure state for reasons of safety. This influence on the availability is not desirable.

In order to categorize whether the transmitted signals are of sufficiently good quality, the so-called Received Signal Strength Indicator (RSSI) exists, e.g. in wireless communication applications, as an indicator for the received field strength of wireless communication applications. The RSSI has no determined unit in such a way that the value of the comparison must be interpreted in dependence on the respective application. Hereby, a larger value corresponds to a better reception. The RSSI is used in communication applications that work in the intermediate frequency (IF) range, and is determined prior to the amplification and demodulation. RFID systems that work in the low frequency range (of e.g. 125 kHz); however, only use simple circuits in such a way that an RSSI determination cannot be implemented without further ado in these systems.

Furthermore, the received signal strength is so low having regard to detection ranges of ≤20 mm so that the smallest fluctuations in the signal strength can have a negative impact. Furthermore, having regard to various environments, the RSSI would be drastically different in such a way that this would be too inaccurate due to the reduced received signal strength, in particular for RFID systems that are operated at e.g. 125 kHz.

For this reason it is an object of the present invention to provide a method by means of which one can reliably recognize whether the RFID system is present in a boundary region in which it is no longer secure that the data transmission between the transponder and the reading device (or vice versa) is of sufficient quality.

This object is satisfied by a method of recognizing whether a transponder of an RFID system, comprising a reading device and the transponder, is present in a boundary region, wherein a comparison is made with at least one threshold value. In accordance with the invention a bit error rate of signals transmitted between the transponder and the reading device is determined and the at least one threshold value comprises a predefined maximum bit error rate between the signals transmitted between the transponder and the reading device.

Thus, at least one threshold value is checked that comprises a predefined maximum bit error rate (erroneous bits per unit time) for signals transmitted between the transponder and the reading device. For this purpose the bit error rate is determined on the basis of signals received either at the transponder or at the reading device and is compared to a threshold value.

The recognition of whether a transponder is present in a boundary region permits the recognition of regions in which erroneous signals have to be feared. When such a region is recognized an indication can be made to a user, for example, by means of an optical warning signal or acoustic warning signal that a recognition of the code, that is stored in a transponder, should be repeated, as e.g. the spacing between the reading device and the transponder was too large. It can also be provided that an electric warning signal is output at a switching output or at a data output that initiates an action resulting therefrom, for example the switching off of a machine. A differently designed warning signal can also be used either directly or as a request to a user in order to provide the information that a boundary region has been reached, however, the received data signal is not sufficiently good and in this way not secure enough in order to start the action actually to be initiated by means of the signal.

The bit error rate is a secure measure for the reliability of the query of the code. It can be easily determined, also at low operating frequencies of the RFID system, as no complicated evaluation circuits are required that are frequently not used, specifically in systems having a low operating frequency.

Insofar the particular advantage of the method in accordance with the invention is present in particular at low operating frequencies, this means in particular when the RFID system is configured to transmit and to receive signals in a frequency range of 100 to 150 kHz, in particular of 120 to 135 kHz.

Preferably, the reading device supplies the transponder with energy. In this way the transponder is charged in order to enable the transmission of the code contained therein.

The bit error rate on the transmission of signals between the transponder and the reading device is then significantly dependent thereon on how well the transponder is charged with the energy transmitted by the reading device. A change of the environment in which the system is operated has an influence on the magnetic coupling between the reading device and the transponder in such a way that the charging of the transponder with energy that is transmitted by the reading device is of different strength. Insofar an RFID system configured in such a way that it carries out the method can be used without a specific calibration at the place of installation in different environments, as the threshold value is selected without a consideration of the actual environment and only relates to the actual quality of the transmitted and/or received data.

Preferably the bit error rate is determined by a comparison of test information also received with a predefined desired information. This can, for example, be a specific piece of test information that is also transmitted. In another respect an evaluation of the received use data can, for example, also be carried out in such a way that a check is made to see whether the use data corresponds to an expected piece of information. In this case the test information is formed by the use data. For this purpose, e.g. a code stored in a transponder and known to the reading device can be drawn on.

Preferably the bit error rate is determined in a predefined window of time, wherein the predefined window of time preferably has a length in the range of 50 ms to 200 ms. Windows of time having such a length are sufficient in order to recognize whether e.g. a chip card or a key that includes a transponder and that is only held for a short period of time in front of a reading device and to carry out a check whether the chip card or the key is allowable.

In a further aspect the invention relates to an RFID system that is configured to carry out the method in accordance with the invention.

The advantages of the RFID system correspond to those that have already been explained in conjunction with the method in accordance with the invention.

In a further aspect the present invention relates to a safety switch comprising an RFID system in accordance with the invention. The advantages of this safety switch result from those that have already been explained in conjunction with the method in accordance with the invention.

Such safety switches are e.g. advantageously used for the monitoring of a closed position of two parts movable relative to one another. Such two parts movable relative to one another are, e.g. used in safety doors, for linearly drivable axes, rotary frames or the like in order to e.g. secure access to a dangerous machine or also to a dangerous movement.

Safety switches are used in applications in which a high level of protection from manipulation is required. For this purpose a code stored in the transponder of an actuator is compared to the expectant code in the safety switch. The safety switch can also be configured particularly small and transmit the results from the mentioned comparison, e.g. via a binary output or communicate e.g. with a central evaluation unit in a switching cabinet.

Figures 2A, 2B:
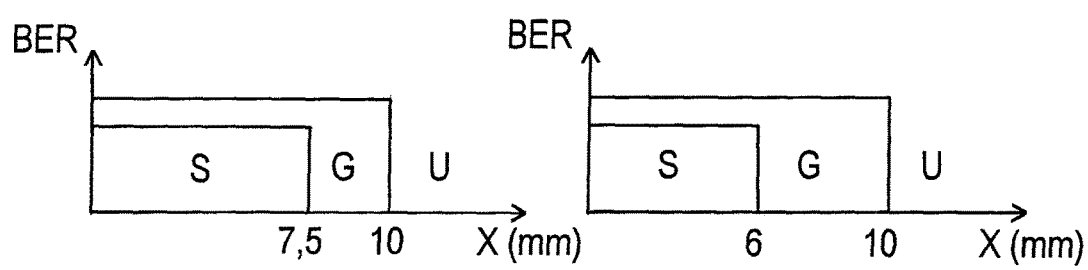
Figure 3:
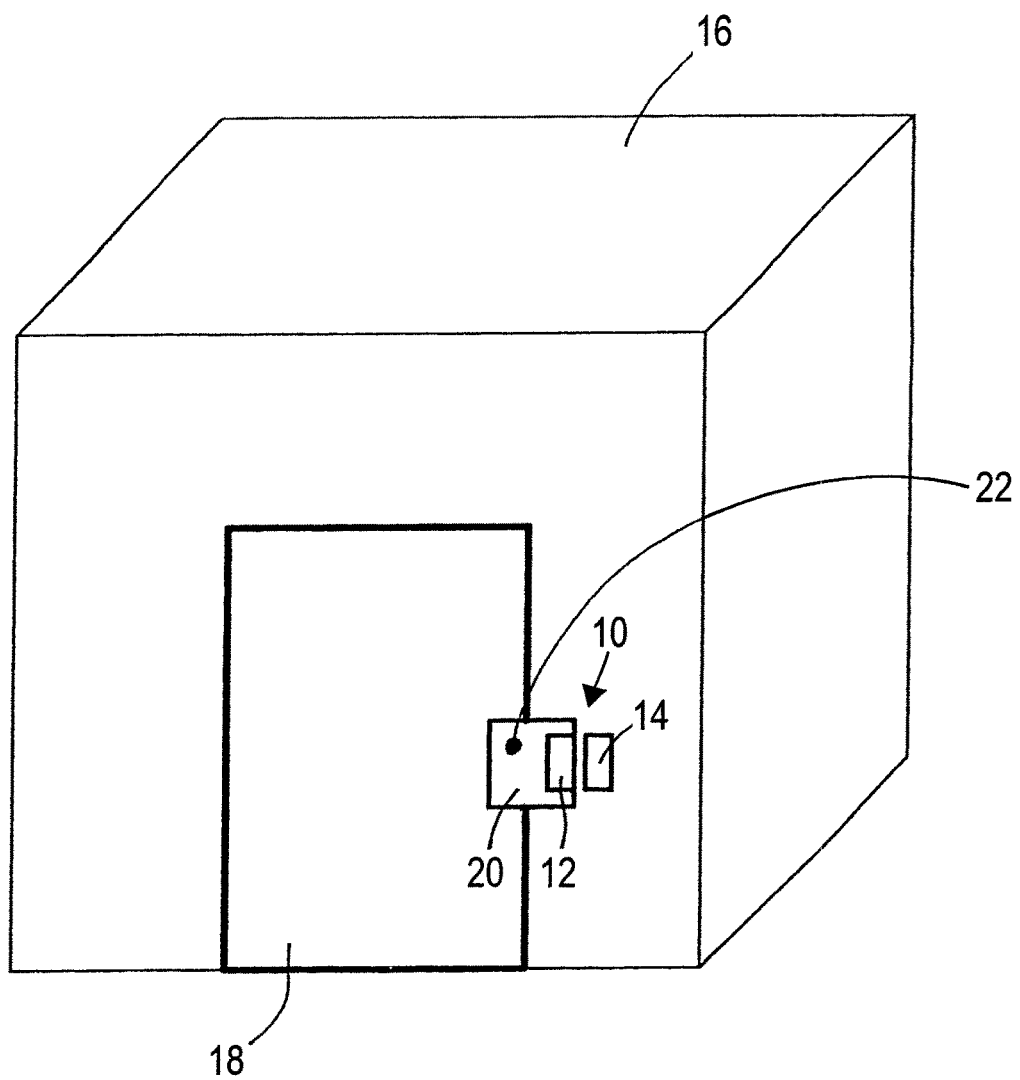

Further advantageous measures and designs of the invention result from the dependent claims. In the following the invention will be described in detail with reference to embodiments and the submitted drawings. In the schematic drawings there is shown in schematic illustration:

FIG. 1 an RFID system,

FIGS. 2a and 2b various boundary regions of like RFID systems in different environments in an illustration of the bit error rate with respect to the spacing of the transponder, and FIG. 3 a use of a safety switch in accordance with the invention.

FIG. 1 shows a schematic illustration of an RFID system 10 having a reading device 12 and a transponder 14. The reading device 12 (transceiver) is configured for the purpose of communicating with the transponder 14 that includes a characteristic code by means of at least one radio unit in a manner known per se. The transponder 14 can be arranged in or at an object (not shown).

During operation of the RFID System 10 the reading device 12 generates magnetic fields of interaction in a manner known per se in order to query data from the transponder 14. The reading device 12 for this purpose comprises a transceiver circuit by means of which the magnetic field is generated.

The magnetic field has a range within which first signals are transmitted for the communication with the transponder 14. As an answer to the first signals the transponder 14 transmits second signals to the reading device 12. For the evaluation of the second signals the reading device 12, for example, communicates with a microcontroller. The first signals can comprise data that e.g. request that the transponder 14 supplies a code stored therein. The second signals then comprise data that include this code. The signals are transmitted between the transponder 14 and the reading device 12 e.g. in the Manchester 32-format.

The transponder can also be configured in such a way that it only has an influence on the magnetic field of the reading device without itself generating a magnetic field. This influencing is then detected by the reading device in the sense of a returned signal.

Furthermore, the reading device 12 is configured for the purpose of supplying the transponder 14 with energy in such a way that this can transmit second signals to the reading device 12, and/or can bring about a manipulation of the magnetic field generated by the reading device. In dependence on the spacing between the reading device 12 and the transponder 14, the transponder 14 experiences different charging states that are dependent on how much energy the transponder 14 is supplied with. These charging states in particular comprise "completely charged", "partly charged" and "not charged". Depending on the charge state the transponder 14 can receive and transmit signals more or less well and secure in such a way that an erroneous transmission can be brought about.

In a boundary region G the transponder is only partly charged with the energy transmitted by the reading device by means of the magnetic field. In the boundary region G signals are indeed also transmitted between the transponder 14 and the reading device 12, however these are possibly erroneous, as e.g. the spacing between the transponder 14 and the reading device is too large or the supply of energy of the transponder 14 is no longer ensured for other reasons.

FIG. 1 considers the case in which the signal transmission possibly no longer works securely due to a possibly too large spacing. As is shown in FIG. 1 the transponder 14 is then present in the boundary region G between a secure region S and a region U in which a communication is no longer possible. Any communication that takes place between the reading device and the transponder can be trusted in the secure region S. Communication can no longer take place between the reading device 12 and the transponder 14 in the region U.

Having regard to the method in accordance with the invention described in this way the bit error rate of a transmitted signal is determined and is compared to a predefined threshold value. The signal tested for this purpose is, for example, the code that is transmitted by the transponder 14 to the reading device 12 following its query. This is, for example, transmitted in the Manchester 32 format in such a way that a determination can be made whether the signal is erroneous when it, for example, no longer corresponds to this format. Having regard to the bit error rate determined in this way a threshold value is determined.

By means of the threshold value it is predefined in this connection from what bit error rate onwards the data that is transmitted by the transponder 14 can still be trusted and which error rate is unacceptable for the RFID system 10.

In this connection the following situations can arise in the RFID system 10:

1. The transponder is placed in the secure region S. In this example the transponder 14 is completely supplied with energy by the reading device 12. The data that is transmitted between the transponder 14 and the reading device 12 has a bit error rate beneath the threshold value. The communication between the reading device 12 and the transponder 14 can be trusted.
2. The spacing between the transponder 14 and the reading device 12 is larger in such a way that the transponder 14 is present in the boundary region G. In this example the transponder 14 is only partly charged and the signals that are transmitted by the transponder 14 to the reading device 12 under some circumstances include erroneous data. Due to the no longer completely charged transponder the data is possibly no longer transmitted without errors in such a way that the bit error rate also increases. On exceeding the predefined threshold value a warning signal is output that informs a user that the transponder 14 is present in the boundary region in which the communication can no longer be unambiguously trusted.
3. If the spacing between the transponder 14 and the reading device 12 is even larger (region U) then the transponder 14 is no longer, or in any way no longer sufficiently, supplied with energy by the reading device 12 in such a way that data can no longer be transmitted between the transponder 14 and the reading device 12.

Having regard to a different conductance of the method in accordance with the invention, a test signal, that is also transmitted by the transponder, is compared with a reference signal stored in the reading device in order to determine the bit error rate. Alternatively, the reading device can also transmit an individual signal to the transponder on transmission of the query to transmit the code, this then retransmits this signal in order to enable a comparison by the reading device.

The transponder is generally configured in such a way that it continuously transmits its signals. This is in particular the case then when the transponder transmits its signals through an influencing of the magnetic field generated by the reading device.

The signals are measured by the reading device in a predefined window of time of e.g. 100 ms and the bit error rate is determined. When the number of erroneous bits exceeds the threshold value an optical warning signal is output at the reading device 12. This can e.g. take place by means of a flashing LED (FIG. 3). The maximum error number can, for example, be selected as 10 error bits in a predefined window of time in such a way that the maximum bit error rate is determined as 100 bps (Bits Per Second) in a window of time of 100 ms. If the error rate is smaller than the boundary value, then this can, for example, be indicated by a continuously lit up LED. If the signals are no longer received when the transponder 14 is too far away then this can, for example indicated in that the LED does not light up.

The FIGS. 2a and 2b by way of example show how the regions S, G and U can change when the RFID system 10 is used in different environments. The corresponding regions are illustrated for like RFID systems in various environments in an illustration of the bit error rate BER (Bit Error Rate) with respect to the spacing x of the transponder 14 from the reading device 12.

In FIG. 2a the reading device 12 and/or the transponder 14 are e.g. applied at a plastic object in contrast to which it/they are fastened e.g. at a metallic object in FIG. 2b. The metallic object of the FIG. 2b influences the magnetic coupling between a transponder 14 and the reading device 12 (and in this way the charging of the transponder by means of the magnetic field of the reading device) in such a way that the secure region S of the FIG. 2b is smaller than that of FIG. 2a.

Also two or more threshold values can be predefined that are associated with different states that are associated with different degrees of reliability of the communication. These can then be indicated by means of different warning signals.

The FIG. 3 shows a safety switch 20 having an RFID system 10 that regulates the access to a building 16. The safety switch 20 in accordance with FIG. 3 is attached to a protective door 18.

In order to open the protective door 18 protected by the safety switch 20 a transponder 14 has to be used that includes the matching access code. As soon as the transponder 14 is recognized within the range of the reading device 12 as having the correct access code, the safety switch 20 and in this way the protective door 18 can be opened. The recognition of this code is carried out on use of the method in accordance with the invention.

The LED 22 is associated with the reading device 12 and outputs an optical signal when a recognition is made that the transponder 14 is present in a boundary region G, in which the communication between the transponder and the reading device can no longer be trusted. The protective door is then not opened. However, a user is informed that this is not necessarily due to the use of the wrong transponder, but due to an inadequate communication.

LIST OF REFERENCE NUMERALS

L10 RFID system
12 reading device
14 transponder
16 building
18 protective door
20 safety switch
22 LED
S secure region
G boundary region
U region in which the communication is not possible
BER bit error rate
x spacing

What is claimed is:
1. A method of recognizing whether a transponder of an RFID system, comprising a reading device and the transponder, is present in a boundary region, the method comprising:
supplying the transponder with energy by means of a signal transmitted from the reading device to enable a transmission of a code included in a signal transmitted from the transponder to the reading device,
wherein the transponder experiences different charging states that are dependent on an amount of energy supplied to the transponder as dependent on a spacing between the reading device and the transponder, with the charge state of the transponder comprising one of the following charge states: completely charged, partly charged and not charged, with the charge state partly charged indicating that the transponder is in the boundary region;

the detection of the presence of the transponder in the boundary region comprising the steps of:
  determining a bit error rate of the signals transmitted from the transponder to the reading device; and
  comparing the determined bit error rate to at least one threshold value to determine the presence of the transponder in the boundary region, the boundary region comprising a region with the transponder charge state partly charged, and with the at least one threshold value comprising a predefined maximum bit error rate between the signals transmitted from the transponder to the reading device, and
  outputting an electric warning signal on recognition that the transponder is present in the boundary region, with the electric warning signal being used for the initiation of a safety action.

2. The method in accordance with claim 1, in which the boundary region corresponds to a region in which the signals that are transmitted and received between the reading device and/or the transponder include erroneous signals.

3. The method in accordance with claim 1, wherein the RFID system is configured to transmit and to receive signals in a frequency range of 100 to 150 kHz.

4. The method in accordance with claim 3, wherein the RFID system is configured to transmit and to receive signals in a frequency range of 120 to 135 kHz.

5. The method in accordance with claim 1, wherein the reading device supplies the transponder with energy.

6. The method in accordance with claim 1, wherein the determination of the bit error rate comprises a comparison between predefined signals and received signals.

7. The method in accordance with claim 1, wherein the signals comprise use data that is transmitted/received by the RFID system.

8. The method in accordance with claim 1, wherein the bit error rate is determined by a comparison of test information, that is also received, with a predefined desired piece of information.

9. The method in accordance with claim 1, wherein the bit error rate is determined from the number of erroneous signals in a predefined window of time.

10. The method in accordance with claim 9, wherein the predefined window of time has a length in the range of 50 ms to 200 ms.

11. The method in accordance with claim 1, wherein the warning signal comprises an optical warning signal or an acoustic warning signal.

12. The method in accordance with claim 1, wherein the warning signal comprises an electric warning signal.

13. The method in accordance with claim 1, wherein the warning signal states that a signal is indeed received by the transponder, but this is not sufficiently secure.

14. An RFID system comprising:
a reading device and a transponder, the reading device supplying the transponder with energy by means of a signal transmitted from the reading device to enable a transmission of a code included in a signal transmitted from the transponder to the reading device,
wherein the RFID system recognizes the presence of the transponder of the RFID system in a boundary region, the boundary region comprising a region with the transponder charge state partly charged, and with the RFID system determining a bit error rate of signals transmitted from the transponder to the reading device;
the RFID system configured to compare the determined bit error rate to at least one threshold value in order to determine the presence of the transponder in the boundary region, with the at least one threshold value comprising a predefined maximum bit error rate between the signals transmitted from the transponder to the reading device, and outputting an electric warning signal on recognition that the transponder is present in the boundary region, with the electric warning signal being used for the initiation of a safety action; and
the reading device having a capability of detecting a charge state of the transponder wherein the transponder experiences different charging states that are dependent on an amount of energy supplied to the transponder as dependent on a spacing between the reading device and the transponder, with the charge state of the transponder comprising one of the following charge states: completely charged, partly charged and not charged, and the detection of the charge state comprising the determination of the bit error rate.

15. A safety switch having an RFID system comprising:
a reading device and a transponder, the reading device supplying the transponder with energy by means of a signal transmitted from the reading device to enable a transmission of a code included in a signal transmitted from the transponder to the reading device; and
the reading device having a capability of detecting a charge state of the transponder, wherein the transponder experiences different charging states that are dependent on an amount of energy supplied to the transponder as dependent on a spacing between the reading device and the transponder, with the charge state of the transponder comprising one of the following charge states: completely charged, partly charged and not charged, the detection comprising a determination of a bit error rate of signals from the transponder to the reading device, and outputting an electric warning signal on recognition that the transponder is present in the boundary region, with the electric warning signal being used for the initiation of a safety action,
  wherein the RFID system is configured for the purpose of carrying out a method of recognizing whether the transponder of the RFID system is present in a boundary
region, the boundary region comprising a region charge state partly charged, and wherein the RFID system is configured to determine the bit error rate of signals transmitted from the transponder to the reading device and the RFID system is further configured to compare the determined bit error rate with at least one threshold value, with the at least one threshold value comprising a predefined maximum bit error rate between the signals transmitted from the transponder to the reading device.

\* \* \* \* \*